United States Patent
Deutsher et al.

(10) Patent No.: US 9,766,136 B2
(45) Date of Patent: Sep. 19, 2017

(54) APPARATUS, SYSTEM AND METHOD OF DETECTING LEAKAGE IN A CHAMBER

(71) Applicants: Ariel Deutsher, Yokneam (IL); Doron Kiwi, Shimshit (IL); Guy Backner, Shchania (IL)

(72) Inventors: Ariel Deutsher, Yokneam (IL); Doron Kiwi, Shimshit (IL); Guy Backner, Shchania (IL)

(73) Assignee: TOWER SEMICONDUCTOR LTD., Migdal Haemek (IL)

( * ) Notice: Subject to any disclaimer, the term of this patent is extended or adjusted under 35 U.S.C. 154(b) by 569 days.

(21) Appl. No.: 14/299,142

(22) Filed: Jun. 9, 2014

(65) Prior Publication Data

US 2015/0355120 A1 Dec. 10, 2015

(51) Int. Cl.
- *G01M 3/00* (2006.01)
- *G01K 3/00* (2006.01)
- *G01K 13/00* (2006.01)
- *G01K 3/14* (2006.01)
- *G05B 23/02* (2006.01)

(52) U.S. Cl.
CPC ........... *G01K 13/00* (2013.01); *G01K 3/14* (2013.01); *G01M 3/002* (2013.01); *G05B 23/0224* (2013.01)

(58) Field of Classification Search
CPC ...................................................... G01M 3/002
USPC .......................................................... 374/4, 5
See application file for complete search history.

(56) References Cited

U.S. PATENT DOCUMENTS

| | | | |
|---|---|---|---|
| 3,549,882 A | 12/1970 | Barrington | |
| 6,885,452 B2 | 4/2005 | McAndrew et al. | |
| 7,166,165 B2 * | 1/2007 | Halpin | C03C 17/225 118/715 |
| 7,519,885 B2 * | 4/2009 | Kaushal | C23C 16/45546 438/17 |
| 7,751,921 B2 * | 7/2010 | Sakamoto | C23C 16/4412 700/108 |
| 8,582,105 B1 | 11/2013 | Liang | |
| 2013/0150997 A1 * | 6/2013 | Tsai | C23C 16/52 700/121 |

* cited by examiner

*Primary Examiner* — Clayton E Laballe
*Assistant Examiner* — Leon W Rhodes, Jr.
(74) *Attorney, Agent, or Firm* — Shichrur & Co.

(57) ABSTRACT

Some demonstrative embodiments include apparatuses, devices and/or methods of detecting leakage in a chamber. For example, an apparatus may include a leakage detector to detect leakage in a chamber based on at least one set of power values corresponding to at least one respective heating zone of the chamber, the set of power values including a plurality of power values corresponding to a respective plurality of manufacturing processes performed by the chamber, wherein a power value of a manufacturing process is based on a plurality of power control values to control the heating zone during the manufacturing process.

20 Claims, 9 Drawing Sheets

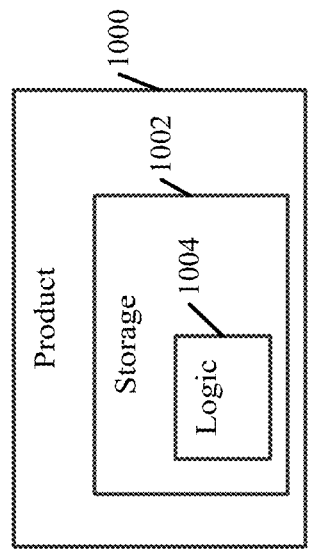

APPARATUS, SYSTEM AND METHOD OF DETECTING LEAKAGE IN A CHAMBER

TECHNICAL FIELD

Embodiments described herein generally relate to detecting leakage in a chamber.

BACKGROUND

An epitaxial (EPI) reactor may be utilized during an EPI process of a semiconductor manufacturing process.

The EPI reactor may include a plurality of heating lamps to heat a plurality of heating zones of a quartz chamber of the EPI reactor during the EPI process.

The EPI reactor may include a plurality of thermocouples to sense temperatures in the plurality of the heating zones. The EPI reactor may be configured to control the plurality of heating lamps based on the sensed temperatures of the heating zones, for example, using a closed loop electronic control system.

A thermocouple (a "leaking thermocouple") may develop damages, e.g., cracks and holes, in liners of the thermocouple, for example, as a result of high temperatures and/or chemicals involved in the EPI process. The damages in the leaking thermocouple may enable air surrounding the quartz chamber to leak into the quartz chamber, and to react with gas used during the EPI process.

As a result of the leakage, an opaque film may be formed on the leaking thermocouple and on a surface of the quartz chamber.

The opaque film may at least partially block radiation from the plurality of heating lamps and, as a result, a quality of the semiconductor manufacturing process may be affected.

The opaque film may increase cost of the semiconductor manufacturing process. In one example, the opaque film may reduce a lifetime of the quartz chamber.

In another example, the opaque film may expedite replacement of parts of the chamber.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 10 is a schematic illustration of a product of manufacture, in accordance with some demonstrative embodiments.

DETAILED DESCRIPTION

Figure 1:
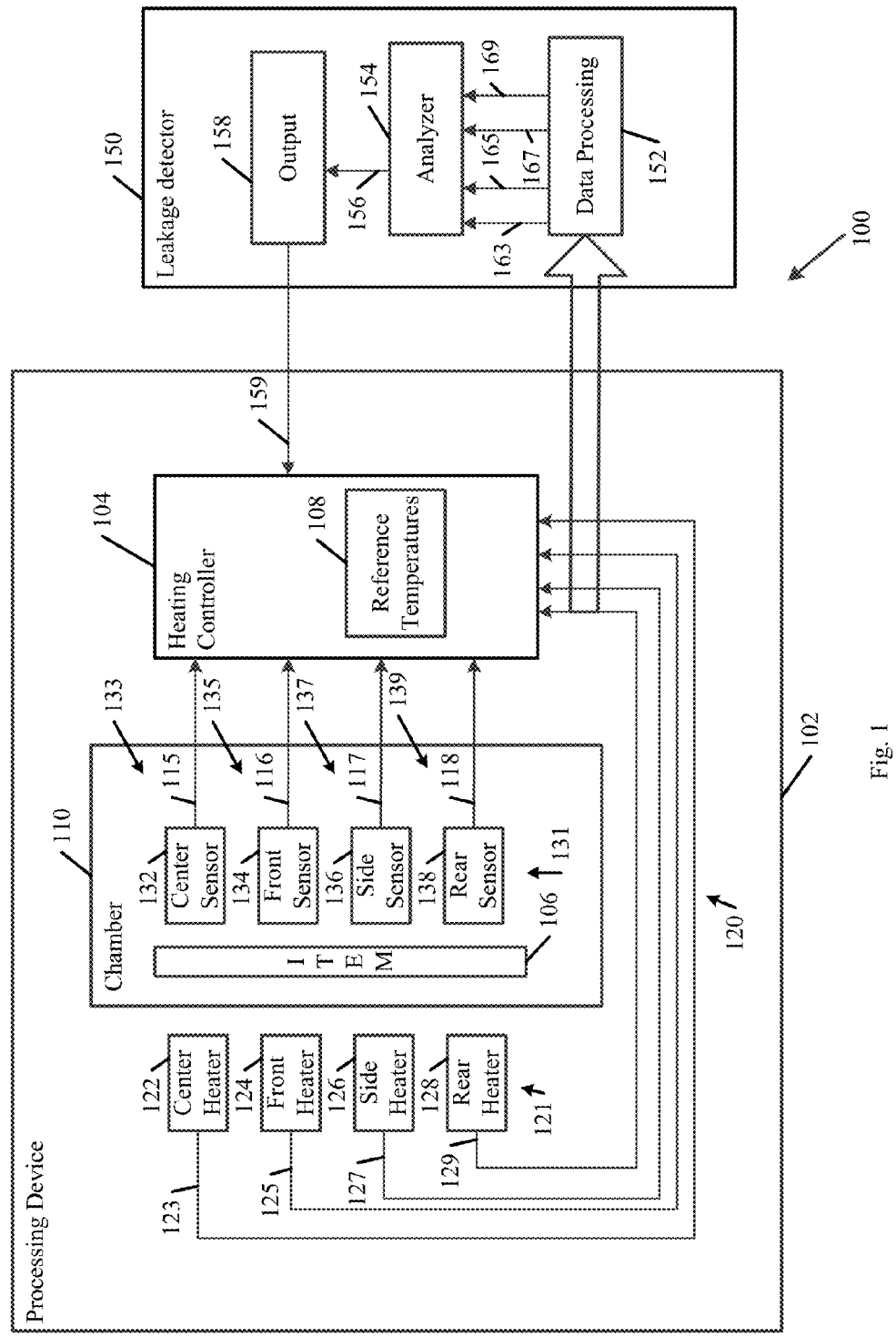
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The term "communicating" as used herein with respect to a communication signal includes transmitting the communication signal and/or receiving the communication signal. For example, a communication interface, which is capable of communicating a communication signal, may include a transmitter to transmit the communication signal to at least one communication unit, and/or a communication receiver to receive the communication signal from at least one communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

The terms "substrate" and/or "wafer", as used herein, may relate to a thin slice of semiconductor material, for example, a silicon crystal, which may be used in fabrication of integrated circuits and/or any other microelectronic devices. For example, the wafer may serve as the substrate for the microelectronic devices, which may be built in and over the wafer.

Reference is made to FIG. 1, which schematically illustrates a block diagram of a system 100, in accordance with some demonstrative embodiments.

In some demonstrative embodiments, system 100 may include a processing device 102 configured to process at least one item 106.

In some demonstrative embodiments, processing device 102 may be utilized to perform one or more semiconductor manufacturing processes. For example, item 106 may include a semiconductor substrate, e.g., a wafer.

In some demonstrative embodiments, device 102 may include a device, e.g., a reactor, to control, process and/or to perform a chemical reaction on item 106.

In one example, device 102 may include an epitaxial (EPI) reactor configured to form an epitaxial layer on the wafer or on any other item 106. In another example, device 102 may include any other reactor to perform any other process on the wafer or on any other item 106.

In some demonstrative embodiments, device 102 may include any a device configured to control, process and/or to perform any other semiconductor or non-semiconductor manufacturing process on item 106.

For example, item 106 may include a Flat Panel Display (FPD) or one or more FPD elements, and device 102 may be utilized as part of a FPD manufacturing process.

Some demonstrative embodiments are described below with respect to a device, e.g., device 102, including a reactor chamber to perform one or more semiconductor processes on a semiconductor substrate, e.g., a wafer. However, other embodiments may be implemented with respect to a device, e.g., device 102, including any other type of chamber, a reactor chamber or a non-reactor chamber, and/or with respect to a device, e.g., device 102, configured to perform any other manufacturing processes, e.g., including any other semiconductor and/or non-semiconductor processes.

In some demonstrative embodiments, device 102 may include a chamber 110 configured to process item 106.

In some demonstrative embodiments, chamber 110 may include a rector chamber configured to process item 106.

In some demonstrative embodiments, chamber 110 may include an EPI growth reactor chamber. For example, chamber 110 may include a quartz chamber configured to grow an epitaxial layer on item 106, e.g., a wafer.

In other embodiments, chamber 110 may include any other chamber configured to perform any other process on item 106.

In some demonstrative embodiments, device 102 may include a plurality of heaters 121 configured to heat a plurality of heating zones of chamber 110.

In some demonstrative embodiments, the plurality of heaters 121 may include a center heater 122 configured to heat a center heating zone 133 of chamber 110; a front heater 124 configured to heat a front heating zone 135 of chamber 110; a side heater 126 configured to heat a side heating zone 137 of chamber 110; and/or a rear heater 128 configured to heat a center heating zone 139 of chamber 110.

In some demonstrative embodiments, center heater 122, front heater 124, side heater 126, and/or rear heater 128 may include one or more heating lamps, for example, spot lamps, lamp arrays, extended lamps, and/or any other element configured to heat chamber 110.

Figure 2:
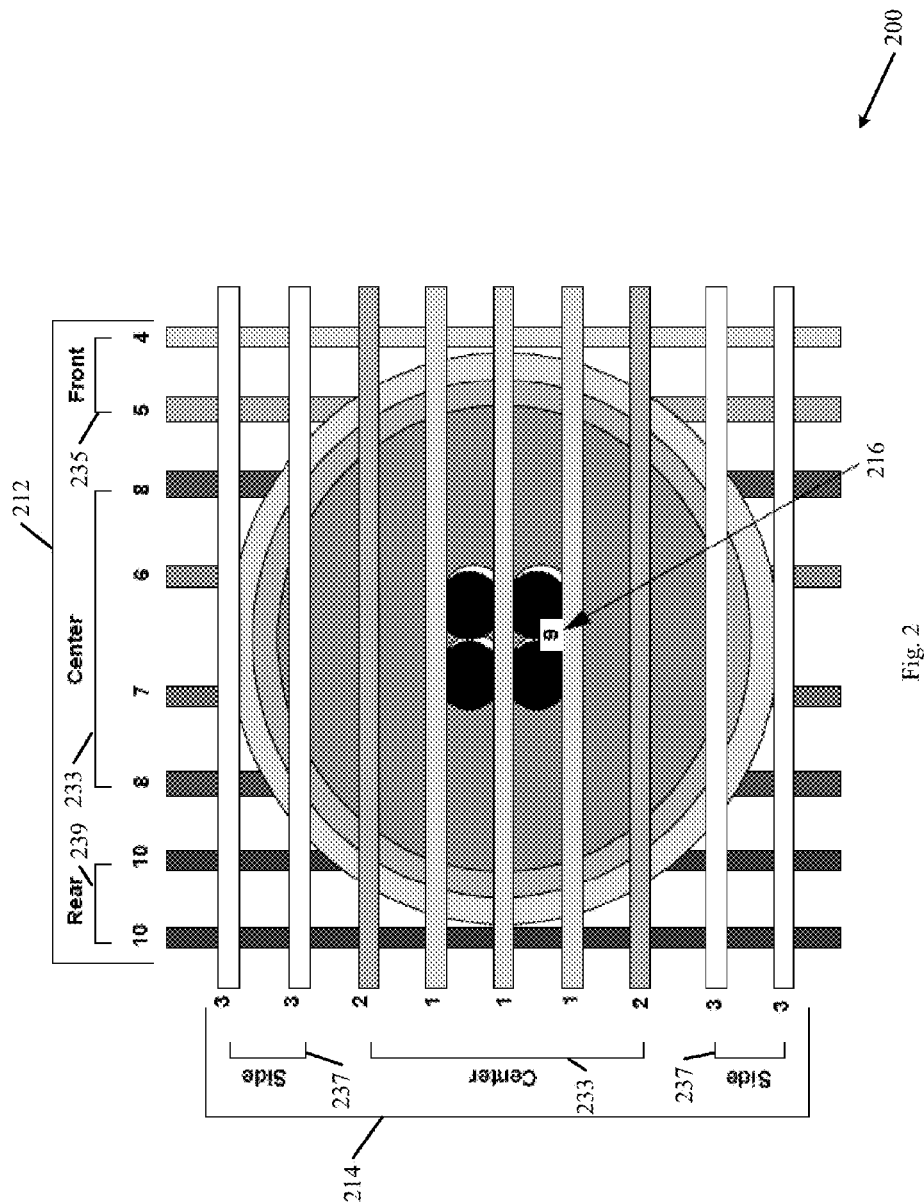
FIG. 2 is a schematic illustration of an arrangement of a plurality of heaters of a reactor chamber, in accordance with some demonstrative embodiments.

Reference is made to FIG. 2, which schematically illustrates an arrangement 200 of a plurality of heaters to heat a corresponding plurality of heating zones of a reactor chamber 210, in accordance with some demonstrative embodiment. For example, reactor chamber 210 may perform the functionality of chamber 110 (FIG. 1), and/or the plurality of heaters may perform the functionality of the plurality of heaters 121 (FIG. 1).

As shown in FIG. 2, the plurality of heaters may include a lower lamp array 212 including seven extended lamps, denoted 10, 10, 8, 7, 6, 8, 5, and 4.

As shown in FIG. 2, the plurality of heaters may include an upper lamp array 214 including nine extended lamps, denoted 3, 3, 2, 1, 1, 1, 2, 3 and 3.

As shown in FIG. 2, the plurality of heaters may include a plurality of spot lamps 216 including four spot lamps, denoted 9.

As shown in FIG. 2, lamps 8, 7, 6, and 8 of lower lamp array 212, lamps 2, 1, 1, 1, and 2 of upper lamp array 214 and spot lamps 216 may be configured to heat a center heating zone 233 of reactor chamber 210. For example, lamps 8, 7, 6, and 8 of lower lamp array 212, lamps 2, 1, 1, 1, and 2 of upper lamp array 214, and/or spot lamps 216 may perform the functionality of center heater 122 (FIG. 1).

As shown in FIG. 2, lamps 4 and 5 of lower lamp array 212 may be configured to heat a front heating zone 235 of reactor chamber 210. For example, lamps 4 and/or 5 of lower lamp array 212 may perform the functionality of front heater 124 (FIG. 1).

As shown in FIG. 2, lamps 3 of upper lamp array 214 may be configured to heat a side heating zone 237 of reactor chamber 210. For example, lamps 3 of upper lamp array 214 may perform the functionality of side heater 126 (FIG. 1).

As shown in FIG. 2, lamps 10 of lower lamp array 212 may be configured to heat a rear heating zone 239 of reactor chamber 210. For example, lamps 10 of lower lamp array 212 may perform the functionality of rear heater 128 (FIG. 1).

Referring back to FIG. 1, in some demonstrative embodiments, device 102 may include a plurality of thermal sensors 131 configured to sense the temperature in the plurality of heating zones of chamber 110. For example, device 102 may include a center thermal sensor 132 configured to sense a center temperature 115 in center heating zone 133, a front thermal sensor 134 configured to sense a front temperature 116 in front heating zone 135, a side thermal sensor 136 configured to sense a side temperature 117 in side heating zone 137, and/or a rear thermal sensor 138 configured to sense a rear temperature 118 in rear heating zone 139.

In some demonstrative embodiments, the plurality of thermal sensors 131 may include one or more quartz-lined thermocouples. In other embodiments, the plurality of thermal sensors 131 may include any other thermocouple.

Figure 3:
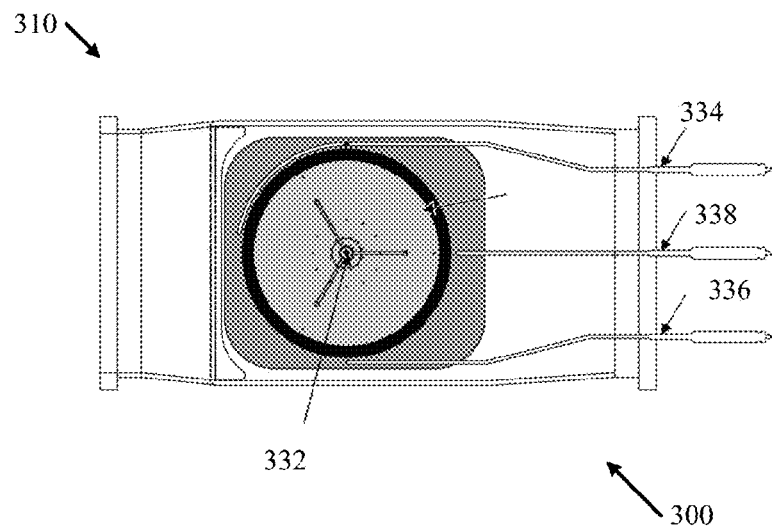
FIG. 3 is a schematic illustration of an arrangement of a plurality of thermal sensors of a reactor chamber, in accordance with some demonstrative embodiments.

Reference is made to FIG. 3, which schematically illustrates an arrangement of a plurality of thermal sensors to sense the temperature of a plurality of heating zones of a reactor chamber 310, in accordance with some demonstrative embodiment. For example, reactor chamber 310 may perform the functionality of chamber 110 (FIG. 1), and/or the plurality of thermal sensors may perform the functionality of the plurality of thermal sensors 131 (FIG. 1).

As shown in FIG. 3, reactor 300 may include a center thermocouple 332 configured to sense temperature in center heating zone 133 (FIG. 1). For example, center thermocouple 332 may perform the functionality of center thermocouple 132 (FIG. 1).

As shown in FIG. 3, reactor 300 may include a front thermocouple 334 configured to sense temperature in front heating zone 135 (FIG. 1). For example, front thermocouple 334 may perform the functionality of front thermocouple 134 (FIG. 1).

As shown in FIG. 3, reactor 300 may include a side thermocouple 336 configured to sense temperature in side heating zone 137 (FIG. 1). For example, side thermocouple 336 may perform the functionality of side thermocouple 136 (FIG. 1).

As shown in FIG. 3, reactor 300 may include a rear thermocouple 338 configured to sense temperature in rear heating zone 139 (FIG. 1). For example, rear thermocouple 338 may perform the functionality of rear thermocouple 138 (FIG. 1).

Referring back to FIG. 1, in some demonstrative embodiments, device 102 may process item 106 using reactive gas, which may affect one or more thermal attributes, e.g., a thermal conductivity, of chamber 110.

In some demonstrative embodiments, device 102 may include a heating controller 104 to control heating and/or the thermal attributes of the plurality of heating zones of chamber 110.

In some demonstrative embodiments, heating controller 104 may control the plurality of heating zones by controlling the plurality of heaters 121.

In some demonstrative embodiments, heating controller 104 may control the plurality of heaters 121 by providing a plurality of power control values 120 to the plurality of heaters 121 during a manufacturing process, for example, a semiconductor manufacturing process, of item 106, e.g., of a wafer.

In some demonstrative embodiments, the plurality of power control values 120 may include a plurality of power control values 123 provided to center heater 122 to control center heating zone 133; a plurality of power control values 125 provided to front heater 124 to control front heating zone 135; a plurality of power control values 127 provided to side heater 126 to control side heating zone 137; and/or a plurality of power control values 129 provided to rear heater 128 to control rear heating zone 139, e.g., during the manufacturing process.

In some demonstrative embodiments, the plurality of power control values 120 may include numerical values configured to instruct and/or to control a respective heater of the plurality of heaters 121.

In one example, the plurality of power control values 120 provided to a heater may include a percentage of a full power of the heater. For example, power control values 123 may include values representing a percentage of full power of center heater 122.

In another example, the plurality of power control values 120 provided to a heater may include values representing absolute power of the heater, e.g., 500 watts.

In another example, the plurality of power control values 120 may include any other numerical values and/or signals.

In some demonstrative embodiments, the plurality of heaters 121 may receive the plurality of power control values 120, and may adjust heating power of the plurality of heaters 121, e.g., according to the plurality of power control values 120.

In some demonstrative embodiments, the plurality of power control values 120 may be configured to increase or decrease the temperature of a heating zone of chamber 110, for example, by increasing or decreasing the heating power of a respective heater of chamber 110.

In one example, the plurality of power control values 123 may be configured to increase the temperature in center heating zone 133, for example, by increasing the heating power of center heater 122.

In another example, the plurality of power control values 125 may be configured to decrease the temperature in front heating zone 135, for example, by reducing the heating power of front heater 124.

In some demonstrative embodiments, heating controller 104 may determine the plurality of power control values 120 based on temperatures 115, 116, 117 and/or 118 sensed by the plurality of thermal sensors 131 during the manufacturing process of item 106.

In some demonstrative embodiments, heating controller 104 may determine the plurality of power control values 120 based on one or more algorithms and/or calculations to be applied to temperatures 115, 116, 117, and/or 118.

In some demonstrative embodiments, heating controller 104 may compare temperatures 115, 116, 117, and/or 118 to one or more reference temperatures 108 during one or more steps of the manufacturing process of item 106, and may provide the plurality of control values 123, 125, 127, and/or 129 based on the reference temperatures 108.

In one example, heating controller 104 may determine during a processing step of the manufacturing process of item 106 that center temperature 115 is lower than a predefined reference center temperature, which may be defined for center heating zone 133 during the processing step. According to this example, heating controller 104 may provide to center heater 122 the plurality of control values 123 configured to control center heater 122 to increase the heating power of center heater 122, and, as a result, to increase the temperature in center heating zone 133.

In some demonstrative embodiments, at least one thermal sensor ("leaking thermal sensor") of the plurality of thermal sensors 131 may develop one or more damages, e.g., cracks and/or holes. For example, center thermal sensor 132 may develop one or more damages, e.g., as described below with reference to FIG. 4.

In one example, quartz liners of thermal sensor 132 may develop the damages, for example, as a result of high temperatures and/or chemicals involved in the manufacturing process of item 106. The damages may enable air from outside of chamber 110 to leak into chamber 110, and to react with reactive gas, e.g., Silicon chloride hydride (Si-HCL3), which may be utilized during the processing of item 106.

In some demonstrative embodiments, chamber 110 may be damaged as a result of a reaction between the reactive gas in chamber 110 and air leaking into chamber 110, e.g., as described below.

The leakage may cause an opaque film to be formed on thermal sensor 132 and/or on a surface of chamber 110. The opaque film may cause mechanical stress on chamber 110, which, in turn, may reduce the lifetime of chamber 110, may expedite part-replacement of chamber 110, and/or may reduce a number of processing cycles of chamber 110.

Figure 4:
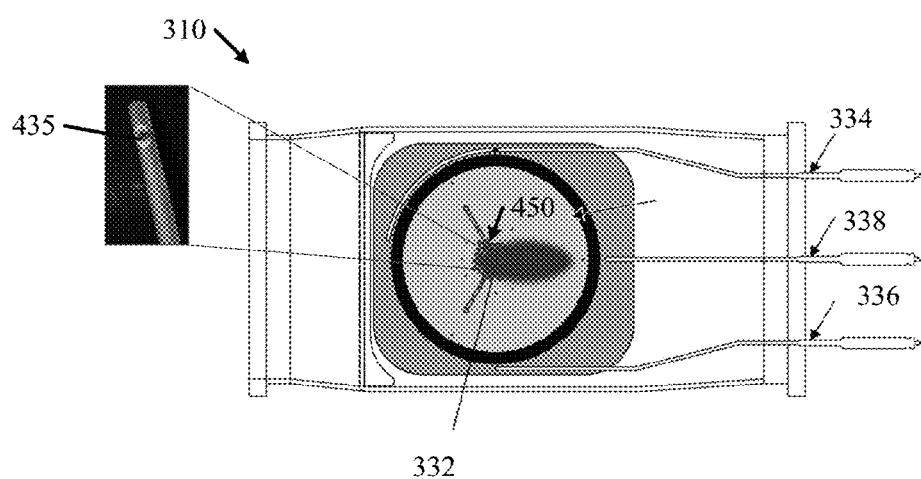
FIG. 4 is a schematic illustration of leakage in the reactor chamber of FIG. 3, in accordance with some demonstrative embodiments.

Reference is made to FIG. 4, which schematically illustrates leakage in reactor chamber 310 (FIG. 3), in accordance with some demonstrative embodiments.

As shown in FIG. 4, center thermal sensor 332 (FIG. 3) may develop damages 435, e.g., cracks and/or holes, in liners of center thermal sensor 332 (FIG. 3), for example, as a result of high temperatures and/or chemicals involved in the processes in reactor camber 310 (FIG. 3).

In some demonstrative embodiments, the damages 435 may cause leakage 450 in reactor chamber 310 (FIG. 3), which may enable air from outside of reactor chamber 310 (FIG. 3) to leak into reactor chamber 310 (FIG. 3).

Referring back to FIG. 1, in some demonstrative embodiments, detecting of leakage 450 (FIG. 4) in time, for example, before the opaque film on the surface of chamber 110 becomes thick and/or unrecoverable, may enable extending lifetime of chamber 110 and/or increasing a number of processing cycles of chamber 110.

In some demonstrative embodiments, detection of leakage 450 (FIG. 4) by a periodic leak detection of chamber 110 may not be efficient and/or may have several disadvantages.

In some demonstrative embodiments, the periodic leak detection may require shutting down device 102 for a time period including a leak detection of a potential leakage and one or more process tests following the leak detection.

In one example, performing the periodic leak detection on an often basis, e.g., every day, may increase a down time of device 102.

Additionally, cooling down chamber 110, for example, before performing the periodic leak detection, may reduce the lifetime of chamber 110.

In some demonstrative embodiments, periodic replacement of the plurality of thermal sensors 131, for example, before the plurality of thermal sensors 131 develop the damages, may not be efficient and/or may have several disadvantages.

In one example, the periodic replacement of the plurality of thermal sensors 131 may require predicting the lifetime of the plurality of thermal sensors 131. It may be difficult to predict the lifetime of the plurality of thermal sensors 131, e.g., at a high level of accuracy.

Accordingly, periodic replacement of the plurality of thermal sensors 131 may increase cost of manufacturing, for example, if the plurality of thermal sensors 131 are replaced early than required; or may result in formation of the unrecoverable coating, for example, if the plurality of thermal sensors 131 are not replaced in time.

Additionally, periodic replacement of the plurality of thermal sensors 131 may include an intrusive action, which may take a relatively long period of time, e.g., a few hours, and may require additional hours for following process tests of device 102.

In some demonstrative embodiments, detection of leakage 450 (FIG. 4) by installing an optical sensor in an exhaust chamber of chamber 110 may not be efficient and/or may have several disadvantages.

In one example, installing the optical sensor may require additional hardware in the exhaust chamber, and additional hardware to support and/or to analyze results of the optical sensor, which may increase cost and/or complexity of device 102.

In another example, installing the optical sensor may require to meet safety requirements, for example, since gases in the exhaust chamber are relatively explosive, which may also increase complexity and cost of device 102.

In another example, installing the optical sensor may degrade the performance of device 102, for example, since the optical sensor requires periodic cleaning and/or part-replacements, e.g., since a coating may be formed on the optical sensor as a result of manufacturing processes in device 102.

In another example, installing the optical sensor to detect leakage may not be suitable for EPI processes performed in reactor chamber 120, e.g., due to specific attributes and/or requirements of the EPI process.

In some demonstrative embodiments, detection of leakage 450 (FIG. 4) by installing a light source and an optical sensor inside chamber 110 may not be efficient and/or may have several disadvantages.

In one example, the light of the light source may be influenced by light of the plurality of heaters 121, e.g., light from the spot lamps, light from the extended lamps, and the like.

In another example, positioning the optical sensor inside chamber 110 at a position, which may enable detecting leakages, e.g., such as leakage 450 (FIG. 4), may be relatively complex and/or may require reconfiguring a design of chamber 110 and/or device 102.

In another example, installing the optical sensor and the light source may require an installation of additional hardware in chamber 110, and/or additional hardware to support and/or to analyze results of the optical sensor, which may increase cost and/or complexity of device 102.

In another example, detection of leakage 450 (FIG. 4) by installing the light source and the optical sensor may not be suitable for the EPI process, e.g., due to specific attributes and/or requirements of the EPI process.

In some demonstrative embodiments, detection of leakage 450 (FIG. 4) by installing an ultraviolet (UV) light source and a detector inside chamber 110 may not be efficient and/or may have several disadvantages.

In one example, installing the UV light source and the detector may not be efficient for non-evacuated systems, e.g., systems having a low vacuum level. Accordingly, installing the UV light source and the detector may not be efficient for the EPI process.

In another example, installing the UV light source and the detector may require an installation of additional hardware in chamber 110, and/or additional hardware to support and/or to analyze results of the detector, which may increase cost and/or complexity of device 102.

Some demonstrative embodiments may enable detecting leakage in chamber 110, for example, even without installing any additional hardware inside chamber 110, e.g., as described below.

Some demonstrative embodiments may enable detecting leakage in chamber 110, for example, even without shutting down device 102 for the periodic leak detection, e.g., as described below.

Some demonstrative embodiments may enable detecting leakage in chamber 110 in time, e.g., before unrecoverable coating is formed on the surface of reactor chamber 100, for example, even without periodically replacing the plurality of thermal sensors 131, e.g., as described below.

Some demonstrative embodiments may enable detecting leakage in a quartz chamber of a reactor configured to process a wafer according to one or more semiconductor processes.

Other embodiments may be implemented to enable detecting leakage in any other chamber of a processing device configured to process any other item according to any other semiconductor and/or non-semiconductor processes.

Some demonstrative embodiments may enable detecting leakage in chamber 110 based on information of a plurality of manufacturing processes performed by device 102, e.g., as described below.

Some demonstrative embodiments may enable detecting leakage in chamber 110 based on information of a plurality of semiconductor manufacturing process performed by device 102. For example, some demonstrative embodiments may enable detecting leakage based on semiconductor manufacturing processes performed by the reactor in the quartz chamber.

Other embodiments may enable detecting leakage in chamber 110 based on information of a plurality of any other manufacturing process performed by device 102. In one example, some demonstrative embodiments may enable detecting leakage based on FPD manufacturing processes performed by device 102.

In some demonstrative embodiments, power monitoring statistical results obtained during plurality of manufacturing process in reactor 120 may be used to distinguish a presence of leakages in chamber 110 from normal power instabilities.

Some demonstrative embodiments may include a leakage detection methodology, which may be based on observed regularities in dependencies of power consumption in time, e.g., when wafers are processed by reactor 120, and a work environment is set.

In some demonstrative embodiments, an average power of heaters 121 may be monitored during a manufacturing process, and a predefined criterion may be applied to the monitored power to distinguish between changes in the monitored power, which may result from leakage, and other changes in the power, e.g., normal changes in the monitored power, which may not be related to leakage.

In some demonstrative embodiments, system 100 may include a leakage detector 150 configured to detect leakage in chamber 110.

In some demonstrative embodiments, leakage detector 150 may be implemented as part of device 102, or as an external device, for example, separate from device 102, e.g., as described below.

In some demonstrative embodiments, leakage detector 150 may be implemented as part of device 102, e.g., as described below with reference to FIG. 7.

In some demonstrative embodiments, leakage detector may be implemented as part of a computing device, e.g., as described below with reference to FIG. 8.

In some demonstrative embodiments, leakage detector 150 may receive the plurality of power control values 120 of the manufacturing process.

In some demonstrative embodiments, leakage detector 150 may include a data processing module 152 to receive the plurality of power control values 120.

In some demonstrative embodiments, data processing module 152 may receive power control values 123, 125, 127 and/or 129 of the manufacturing process.

In some demonstrative embodiments, data processing module 152 may be configured to receive a plurality of power control values of part of the manufacturing process, e.g., the semiconductor manufacturing process. For example, data processing module 152 may be configured to receive a plurality of power control values of a particular step, procedure, action, and/or operation of the semiconductor manufacturing process.

In some demonstrative embodiments, power control values 123, 125, 127 and/or 129 may include a plurality of power control values to control the plurality of heaters 121 during an epitaxial layer deposition step of the semiconductor manufacturing process of item 106.

In other embodiments, power control values 123, 125, 127 and/or 129 may include a plurality of power control values to control the plurality of heaters 121 during any other step, procedure, action, and/or operation of the manufacturing process of item 106.

In some demonstrative embodiments, data processing module 152 may determine at least one power value based on power control values 123, 125, 127 and/or 129 of a manufacturing process, e.g., as described below.

In some demonstrative embodiments, the at least one power value may include a power value corresponding to at least one heating zone of chamber 110 during the manufacturing process, e.g., as described below.

In some demonstrative embodiments, data processing module 152 may determine the at least one power value of the at least one heating zone based on a plurality of power control values 120 to control the heating zone during the manufacturing process.

For example, data processing module 152 may determine a center power value of the manufacturing process, based on the plurality of power control values 123 to control center heating zone 133 during the manufacturing process. Additionally or alternatively, data processing module 152 may determine a front power value of the manufacturing process, based on the plurality of power control values 125 to control front heating zone 135 during the manufacturing process. Additionally or alternatively, data processing module 152 may determine a side power value of the manufacturing process, based on the plurality of power control values 127 to control side heating zone 137 during the manufacturing process. Additionally or alternatively, data processing module 152 may determine a rear power value of the manufacturing process, based on the plurality of power control values 129 to control rear heating zone 139 during the manufacturing process.

In some demonstrative embodiments, the power value corresponding to the heating zone may be determined by applying a mathematical function to the plurality of power control values to control the heating zone during the manufacturing process. For example, the center power value may be determined by applying a mathematical function to the plurality of power control values 123 to control center heating zone 133 during the semiconductor manufacturing process.

In one example, the power value corresponding to the heating zone may be based on an arithmetic mean ("average") of the plurality of power control values to control the heating zone during the manufacturing process. For example, the center power value may be based on an arithmetic mean of the plurality of power control values 123 to control center heating zone 133 during the semiconductor manufacturing process.

In another example, the power value corresponding to the heating zone may be based on any other average or mathematical function applied to the plurality of power control values to control the heating zone during the manufacturing process. For example, the power value corresponding to the heating zone may be determined as a median, a moving average, a weighted average, a percentile, or the like, of the plurality of power control values corresponding to the heating zone.

In some demonstrative embodiments, leakage detector 150 may detect leakage in chamber 110 based on at least one set of power values corresponding to at least one respective heating zone of chamber 110, e.g., as described below. In some demonstrative embodiments, leakage detector 150 may detect leakage in chamber 110 based on a set of center power values 163 corresponding to center heating zone 133, a set of front power values 165 corresponding to front heating zone 135, a set of side power values 167 corresponding to side heating zone 137, and/or a set of rear power values 169 corresponding to rear heating zone 139, e.g., as described below.

In some demonstrative embodiments, the at least one set of power values may include a plurality of power values corresponding to a respective plurality of manufacturing processes performed by chamber 110.

In some demonstrative embodiments, a power value of the set of power values corresponding to the heating zone may include the power value of the heating zone during the manufacturing process.

For example, the set of center power values 163 may include a plurality of center power values, e.g., as determined by data processor 152, corresponding to the respective plurality of manufacturing processes; the set of front power values 165 may include a plurality of front power values, e.g., as determined by data processor 152, corresponding to the respective plurality of manufacturing processes; the set of side power values 167 may include a plurality of side power values, e.g., as determined by data processor 152, corresponding to the respective plurality of manufacturing processes; and/or the set of rear power values 169 may include a plurality of side power values, e.g., as determined by data processor 152, corresponding to the respective plurality of manufacturing processes.

In some demonstrative embodiments, leakage detector 150 may detect leakage in chamber 110 based on at least one set of power values corresponding to at least one respective heating zone of the plurality of heating zones of chamber 110. For example, leakage detector 150 may detect leakage in chamber 110 based on at least one set of the set of power values 163, 165, 167 and/or 169.

In some demonstrative embodiments, leakage detector 150 may detect at least one leaking thermal sensor of the plurality of thermal sensors 131, based on at least one predefined criterion corresponding to the at least one set of power values, e.g., as described below.

In some demonstrative embodiments, the predefined criterion may relate to a statistical function of the at least one set of power values.

In some demonstrative embodiments, leakage detector 150 may detect a particular leaking thermal sensor of a particular heating zone of chamber 110, based on a set of power values corresponding to the particular heating zone. For example, leakage detector 150 may detect leaking center thermal sensor 132 of heating zone 133 based on the set of center power values 163 corresponding to canter heating zone 133.

In some demonstrative embodiments, leakage detector 150 may detect a particular leaking thermal sensor of a particular heating zone of chamber 110, based on a set of power values corresponding to another heating zone. For example, leakage detector 150 may detect leaking side thermal sensor 136 of side heating zone 137 based on the set of rear power values 169 corresponding to rear heating zone 139.

In some demonstrative embodiments, leakage detector 150 may detect a particular leaking thermal sensor of a particular heating zone, based on any other combination of the sets of power values 163, 165, 167 and/or 169. For example, leakage detector 150 may detect leaking front thermal sensor 134 of heating zone 135, based on the set of front power values 165 corresponding to front heating zone 135, and the set of center power values 163 corresponding to center heating zone 133.

In some demonstrative embodiments, leakage detector 150 may include an analyzer 154 configured to analyze the sets of power values 163, 165, 167 and/or 169 and to detect the leakage in chamber 110.

In some demonstrative embodiments, analyzer 154 may output an indication message 156 to indicate the leakage.

In some demonstrative embodiments, leakage detector 150 may include an output 158 configured to output indication message 156.

In one example, output 158 may include a display configured to display indication message 156.

In another example, output 158 may include an alarm lamp, e.g., a red caution lamp, configured to emit red light and/or blink red light, for example, in response to indication message 156.

In another example, output 158 may include any other output, e.g., a speaker, an alarm, and the like.

In some demonstrative embodiments, leakage detector 150 may output an instruction 159 configured to halt the operation of chamber 110. For example, output 158 may send instruction signal 159 to controller 104, and instruction signal 159 may be configured to instruct heating controller 104 to stop the heating of chamber 110 and/or to halt operation of device 102.

In some demonstrative embodiments, analyzer 154 may analyze the set of power values 163, 165, 167, and/or 169, and may determine the particular leaking thermal sensor based on the predefined criterion corresponding to the at least one set of the sets of power values 163, 165, 167 and/or 169.

In one example, the set of power values 163, 165, 167, and/or 169 may be affected by the particular leaking thermal sensor. For example, a leak in the particular leaking thermal sensor may result in an opaque film being formed on the leaking thermal sensor and on the surface of chamber 110. The opaque film may change a thermal regime of the particular thermal sensor and, accordingly, may influence temperatures 115, 116, 117 and/or 118. Due to changes in temperatures 115, 116, 117, and/or 118, heating controller 104 may increase or decrease the power to a heating zone controlled by the leaking thermal sensor. Adjacent heating zones, e.g., adjacent to the heating zone, may compensate power, for example, in an opposite direction, as a result of the increase or the decrease in the heating zone.

In some demonstrative embodiments, the predefined criterion may include a criterion configured to detect, identify, and/or distinguish changes in the sets of power values 163, 165, 167, and/or 169, which are caused by the leakage.

In some demonstrative embodiments, the predefined criterion may be configured to distinguish between changes in the power values 120, which may result from leakage, and other changes in the power values 120, e.g., normal changes in the power values 120, which may not be related to leakage.

In one example, the predefined criterion may include a criterion configured to detect a monotonic increase or decrease in values of the sets of power values 163, 165, 167, and/or 169. For example, the criterion may include determining whether or not each power value of a set of power values is greater or lesser than a previous value, e.g., an immediately preceding power value, of the set of power values.

In another example, the predefined criterion may include a criterion configured to detect a sudden increase or decrease, e.g., jumps or drops, in values of the sets of power values 163, 165, 167, and/or 169. For example, the criterion may include determining whether or not a difference between a power value and a previous power value is greater or lesser than a predefined threshold.

In another example, the predefined criterion may include a criterion configured to detect a shift, e.g., a shift up or a shift down, in values of the sets of power values 163, 165, 167, and/or 169. For example, the criterion may include determining whether or not a moving average of a set of power values, e.g., within a predefined moving average time window, is greater or lesser than a moving average of a previous set of power values.

In another example, the predefined criterion may include a criterion configured to detect any other statistical attribute relating to the power values in the sets of power values 163, 165, 167, and/or 169.

In some demonstrative embodiments, analyzer 154 may determine the particular leaking thermal sensor based on the sets of power values 163, 165, 167, and/or 169, e.g., as described below.

In some demonstrative embodiments, analyzer 154 may detect rear leaking thermal sensor 138 corresponding to rear heating zone 139, based on the set of rear power values 169.

In one example, analyzer 154 may detect rear leaking thermal sensor 138, for example, responsive to a sudden drop in values of the set of rear power values 169, e.g., a drop greater than a predefined threshold value.

In some demonstrative embodiments, analyzer 154 may detect a side leaking thermal sensor 136 corresponding to side heating zone 137, based on the set of side power values 167 and/or the set of rear power values 169.

In one example, analyzer 154 may detect side leaking thermal sensor 136, for example, responsive to a monotonic increase in values of the set of side power values 167, and/or a monotonic decrease in values of the set of rear power values 169, e.g., a monotonic increase or decrease over a predefined number of successive power values, an accumulated increase or decrease which is greater than a predefined threshold.

In some demonstrative embodiments, analyzer 154 may detect a center leaking thermal sensor 132 corresponding to center heating zone 133, based on the set of center power values 133, the set of front power values 135, and the set of side power values 137.

In one example, analyzer 154 may detect center leaking thermal sensor 132, for example, responsive to a sudden drop in values of the set of center power values 163, an increase in values of the set of front power values 165, and/or a jump in values of the set of side power values 163, e.g., as described below with reference to FIG. 5.

In some demonstrative embodiments, analyzer 154 may detect a front leaking thermal sensor 134 corresponding to front heating zone 135, based on the set of center power values 133, the set of front power values 135, and the set of side power values 137.

In one example, analyzer 154 may detect front leaking thermal sensor 134, for example, responsive to a sudden drop in values of the set of center power values 163, an increase in values of the set of front power values 165, and/or a jump in values of the set of side power values 163, e.g., as described below with reference to FIG. 5.

Figure 5:
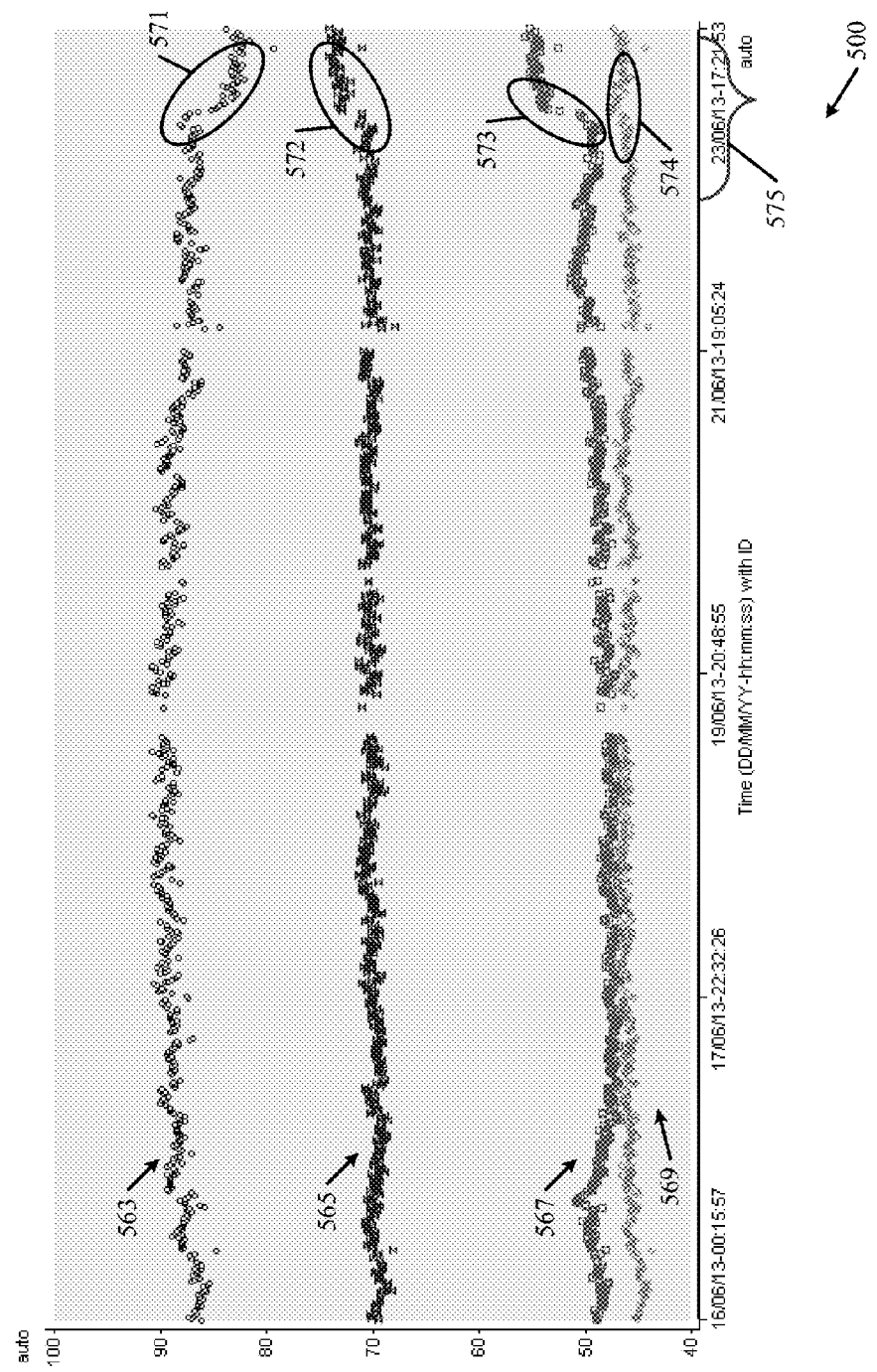
FIG. 5 is a schematic illustration of a graph depicting four sets of power values versus time, in accordance with some demonstrative embodiments.

Reference is made to FIG. 5, which schematically illustrates a graph 500 depicting sets of power values of a plurality of heaters of a reactor chamber versus time, e.g., in accordance with some demonstrative embodiments. For example, the reactor chamber may perform the functionality of chamber 110 (FIG. 1), and/or the plurality of heaters may perform the functionality of the plurality of heaters 121 (FIG. 1).

As shown in FIG. 5, graph 500 may include a set of center power values 563, a set of front power values 565, a set of side power values 567, and/or a set of rear power values 539. For example, the set of center power values 563 may include the set of center power values 163 (FIG. 1), the set of front power values 565 may include the set of front power values 165 (FIG. 1), the set of side power values 567 may include the set of side power values 167 (FIG. 1), and/or the set of rear power values 569 may include the set of rear power values 169 (FIG. 1).

As shown in FIG. 5, there may be a change 571, e.g., a decrease, in values of the set of center power values 563 corresponding to a respective plurality of semiconductor manufacturing processes 575.

As shown in FIG. 5, there may be a change 572, e.g., an increase and a shift up, in values of the set of front power values 565 corresponding to the respective plurality of semiconductor manufacturing processes 575.

As shown in FIG. 5, there may be a change 573, e.g., a jump, in values of the set of front power values 567 corresponding to the respective plurality of semiconductor manufacturing processes 575.

As shown in FIG. 5, there may not be any significant trend and/or change (574) in values of the set of rear power values 567 corresponding to the respective plurality of semiconductor manufacturing processes 575.

As shown in FIG. 5, changes 563, 565, and/or 567 may be distinguished from other power changes, for example, normal power changes, e.g., as a result of process changes, thermal fluctuations, and the like.

In some demonstrative embodiments, analyzer 154 (FIG. 1) may determine a front leaking thermocouple 134 (FIG. 1) and/or a center leaking thermocouple 132 (FIG. 1) based on changes 571, 572, and/or 573, for example, according to the predefined criterion, e.g., as described above.

As shown in FIG. 5, analyzer 154 (FIG. 1) may be able to determine changes 571, 572 and/or 573 within a relatively reduced number of semiconductors manufacturing processes 575.

As shown in FIG. 5, analyzer 154 (FIG. 1) may be able to determine changes 571, 572 and/or 573, within approximately less than ten semiconductor manufacturing processes.

Referring back To FIG. 1, in some demonstrative embodiments, detecting a leaking thermal sensor of the chamber 110 within a relatively short time, e.g., within less than ten semiconductor manufacturing processes, from a time at which damages develop in the leaking thermal sensor, may enable to halt operation of device 102, and to replace a leaking thermal sensor, for example, before an unrecoverable coating is formed on the surface of chamber 110.

In some demonstrative embodiments, the ability to replace the leaking thermal sensor in time, may increase lifetime of chamber 110. For example, the ability to replace the leaking thermal sensor in time, may increase a number of recycling times of chamber 110, and/or may increase time between part replacements of chamber 110.

In some demonstrative embodiments, detecting the leaking thermal sensor may enable improving one or more attributes of the semiconductor manufacturing process in device 102. For example, detecting the leaking thermal sensor may improve resistivity and/or a uniformity of item 106, may reduce an amount of particles on item 106, may increase yield, and/or the like.

In some demonstrative embodiments, detecting the leaking thermal sensor based on at least one set of the sets of power values 163, 165, 167, and/or 169 may enable detecting the leaking thermal sensor in time, e.g., even without performing periodic leak checking and/or periodic thermal sensor replacement of the plurality of thermal sensors 131.

In some demonstrative embodiments, detecting the leaking sensor in time may increase the utilization of device 102, e.g., by reducing downtime and the time of the following tests, and/or may increase operation time.

In some demonstrative embodiments, detecting of the leaking thermal sensor based on at least one set of the sets of power values 163, 165, 167, and/or 169 may enable detecting the leaking thermal sensor utilizing existing and/or available information of device 102, for example, even without installing any additional hardware inside chamber 110.

In some demonstrative embodiments, utilizing the existing and/or available information may be cost effective, non-complex, and/or efficient.

Figure 6:
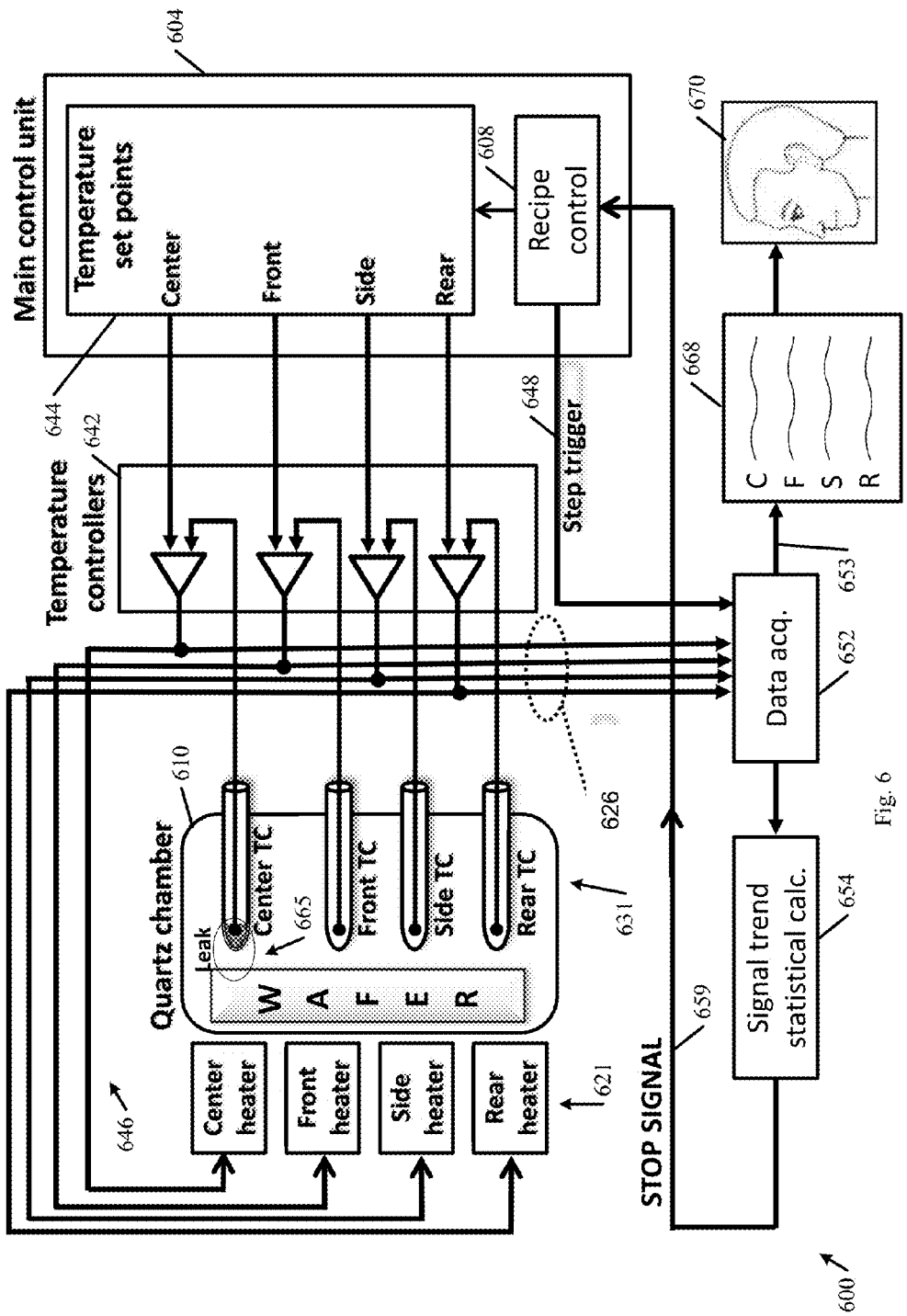
FIG. 6 is a schematic illustration of a system, in accordance with some demonstrative embodiments.

Reference is made to FIG. 6, which schematically illustrates a system 600, in accordance with some demonstrative embodiments. For example, system 600 may perform the functionality of system 100 (FIG. 1).

As shown in FIG. 6, system 600 may include a reactor 620 configured to process a wafer 606 in a reactor chamber 610. For example, reactor 620 may perform the functionality of device 102 (FIG. 1) and/or reactor chamber 610 may perform the functionality of chamber 110 (FIG. 1).

As shown in FIG. 6, reactor chamber 610 may be heated by a plurality of heaters 621. For example, the plurality of heaters 621 may perform the functionality of the plurality of heaters 121 (FIG. 1).

As shown in FIG. 6, reactor 620 may include a main control unit 604 to control the heating power of the plurality of heaters 621. For example, main control unit 604 may perform the functionality of heating controller 104 (FIG. 1).

As shown in FIG. 6, main control unit 604 may receive temperatures ("sensed temperatures") sensed in reactor chamber 610 via a plurality of thermal sensors 631, and may compare the sensed temperatures, e.g., using a plurality of temperature controllers 642, to respective predefined temperature set points 644. For example, the plurality of thermal sensors 631 may perform the functionality of the plurality of thermal sensors 131 (FIG. 1).

As shown in FIG. 6, main control unit 604 may provide a plurality of power control values 646 to control the heating power of the plurality of heaters 621, based on the comparison between the sensed temperatures and the respective predefined temperature set points 644. For example, the plurality of power control values 646 may include power control values 123, 125, 127 and/or 129 (FIG. 1).

As shown in FIG. 6, main control unit 604 may include a process control module 608 configured to control a manufacturing process of wafer 606.

As shown in FIG. 6, control module 608 may generate a trigger 648, for example, each time control module 608 initiates the step of the epitaxial layer deposition of the manufacturing process.

As shown in FIG. 6, system 600 may include a data acquisition module 652 to receive power control values 646, for example, each time control module 608 initiates the step of the epitaxial layer deposition of the manufacturing process. For example, data acquisition module 652 may perform the functionality of data processing module 152 (FIG. 1).

Accordingly, data acquisition module 652 may output a plurality of sets of power values 653 corresponding to a plurality of respective manufacturing processes. For example, the plurality of sets of power values 653 may include the sets of power values 163, 165, 167 and/or 169 (FIG. 1).

As shown in FIG. 6, system 600 may include a calculator 654 to analyze the plurality of sets of power values 653, and to detect leakage 665 in reactor chamber 610, for example, based on the predefined criterion applied to the plurality of sets of power values 653. For example, calculator 654 may perform the functionality of analyzer 154 (FIG. 1).

As shown in FIG. 6, calculator 654 may generate a stop signal 659 configured to stop operation of reactor chamber 610, for example, by control module 608.

As shown in FIG. 6, additionally and/or alternatively data acquisition module 652 may output a graph 668, e.g., graph 500 (FIG. 5), depicting the plurality of sets of power values 653.

As shown in FIG. 6, graph 668 may enable a user 670 to inspect the graph 668 and to detect leakage 665 based on visual inspection of graph 668.

Figure 7:
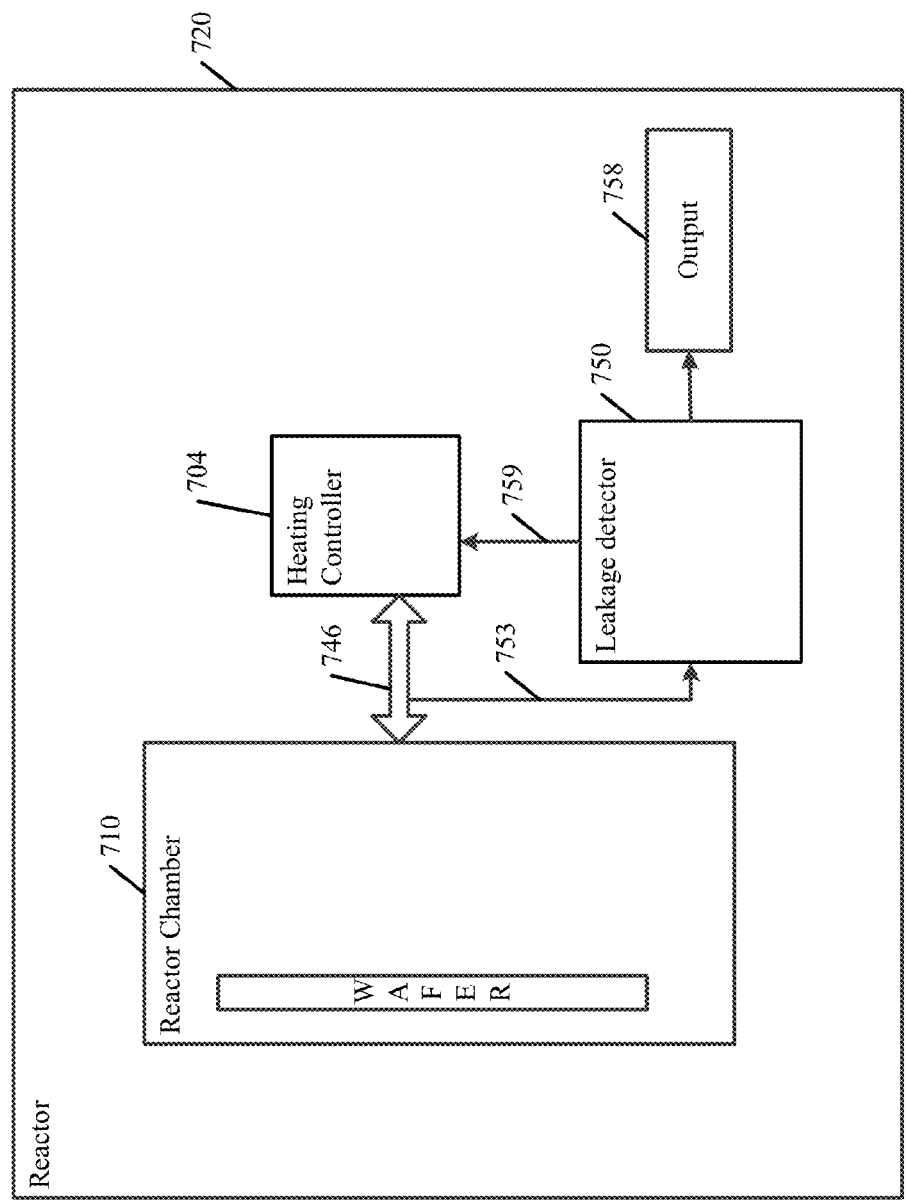
FIG. 7 is a schematic illustration of a leakage detector implemented as part of a reactor, in accordance with some demonstrative embodiments.

Reference is made to FIG. 7, which schematically illustrates a leakage detector 750 implemented as part of a reactor 720, in accordance with some demonstrative embodiments. For example, reactor 720 may perform the functionality of device 102 (FIG. 1) and/or leakage detector 750 may perform the functionality of leakage detector 150 (FIG. 1).

As shown in FIG. 7, reactor 720 may include a heating controller 704 configured to control heating of a reactor chamber 710 using a plurality of power control values 746. For example, reactor chamber 710 may perform the functionality of chamber 110 (FIG. 1) and/or heating controller 704 may perform the functionality of heating controller 104 (FIG. 1).

As shown in FIG. 7, leakage detector 750 may acquire information 753 from the plurality of power control values 746 and may determine leakage in reactor chamber 710 based on information 753. For example, information 753 may include the sets of power values 163, 165, 167 and/or 169 (FIG. 1).

As shown in FIG. 7, leakage detector 750 may output a signal 759 configured to halt the operation of reactor 720, e.g., to stop heating of reactor chamber 710.

As shown in FIG. 7, reactor 720 may include an output 758 configured to output an indication message to indicate the leakage in reactor chamber 710. For example, output 758 may perform the functionality of output 158 (FIG. 1).

Figure 8:
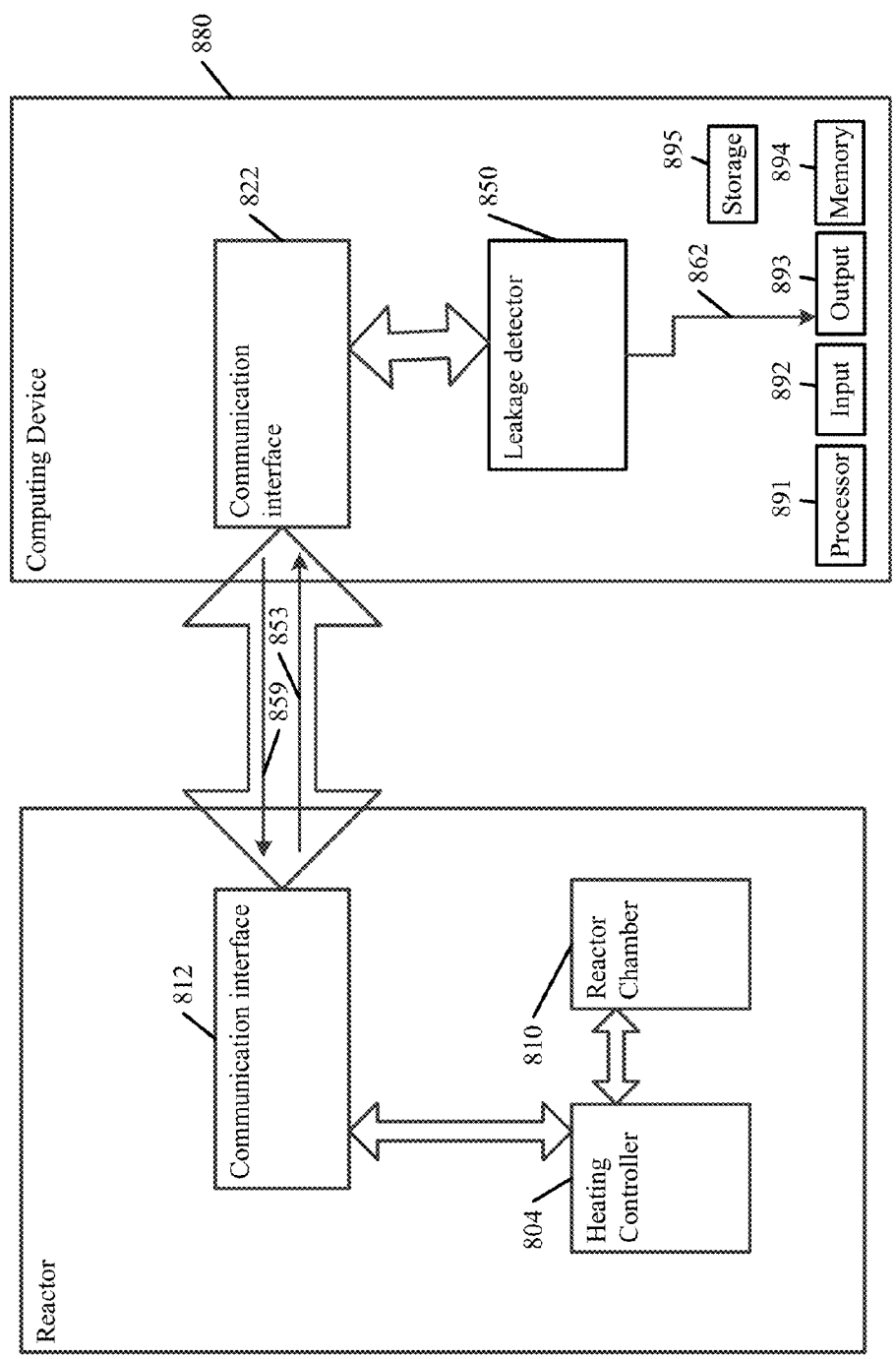
FIG. 8 is a schematic illustration of a leakage detector implemented as part of a computing device, in accordance with some demonstrative embodiments.

Reference is made to FIG. 8, which schematically illustrates a leakage detector 850 implemented by a computing device 880, in accordance with some demonstrative embodiments. For example, leakage detector 850 may perform the functionality of leakage detector 150 (FIG. 1).

In some demonstrative embodiments, computing device 880 may include, for example, a PC, a desktop computer, a mobile computer, a laptop computer, an Ultrabook™ computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a mobile or portable device, a non-mobile or non-portable device, a mobile phone, a cellular telephone, a PDA device which incorporates a wireless communication device, an Ultra Mobile Device (UMD), an Ultra Mobile PC (UMPC), a Smartphone, or the like.

In some demonstrative embodiments, computing device 880 may also include, for example, a processor 891, an input unit 892, an output unit 893, a memory unit 894, and a storage unit 895. Computing device 880 may optionally include other suitable hardware components and/or software components. In some demonstrative embodiments, some or all of the components of computing device 880 may be enclosed in a common housing or packaging, and may be interconnected or operably associated using one or more wired or wireless links. In other embodiments, components computing device 880 may be distributed among multiple or separate devices.

Processor 891 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 891 executes instructions, for example, of an Operating System (OS) of computing device 880 and/or of one or more suitable applications.

Memory unit 894 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 895 may include, for example, a hard disk drive, a floppy disk drive, a Compact Disk (CD) drive, a CD-ROM drive, a DVD drive, or other suitable removable or non-removable storage units. For example, memory unit 894 and/or storage unit 895, for example, may store data processed by computing device 880.

Input unit 892 may include, for example, a keyboard, a keypad, a mouse, a touch-screen, a touch-pad, a track-ball, a stylus, a microphone, or other suitable pointing device or input device. Output unit 893 may include, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

As shown in FIG. 8, computing device 880 may include a communication interface 812 configured to communicate with a communication interface 822 of a reactor 820 via a wired and/or a wireless communication link. For example, reactor 820 may perform the functionality of device 102 (FIG. 1).

In some demonstrative embodiments, communication interfaces 812 and/or 822 may include may include one or more transmitters, receivers and/or transceivers able to send and/or receive communication signals, RF signals, frames, blocks, transmission streams, frames, messages, data items, and/or data. In one example, communication interfaces 812 and/or 822 may include modulation elements, demodulation elements, amplifiers, analog to digital and digital to analog converters, filters, and/or the like. For example, communication interfaces 812 and/or 822 may include or may be implemented as part of a Network Interface Card (NIC), and the like.

As shown in FIG. 8, reactor 820 may include a heating controller 804 configured to control operation of reactor 820 and to control heating of a reactor chamber 810 of reactor 820. For example, heating controller 804 may perform the functionality of heating controller 104 (FIG. 1) and/or reactor chamber 810 may perform the functionality of chamber 110 (FIG. 1).

As shown in FIG. 8, leakage detector 850 may acquire information 853 from reactor 820 and may determine leakage in reactor chamber 810 based on information 853. For example, information 853 may include the sets of power values 163, 165, 167 and/or 169 (FIG. 1).

As shown in FIG. 8, leakage detector 850 may send to heating controller 804 an instruction 859 configured to halt operation of reactor 820, for example, upon detection of leakage in reactor chamber 810.

Additionally or alternatively, leakage detector 850 may output, e.g., via output unit 893, an indication message to indicate the leakage, e.g., as described above.

Additionally or alternatively, leakage detector 850 may output, e.g., via output unit 893, a graph, e.g., graph 500 (FIG. 5), to enable visual inspection of the graph by a user, for example, in order to manually detect the leakage, e.g., as described above.

Figure 9:
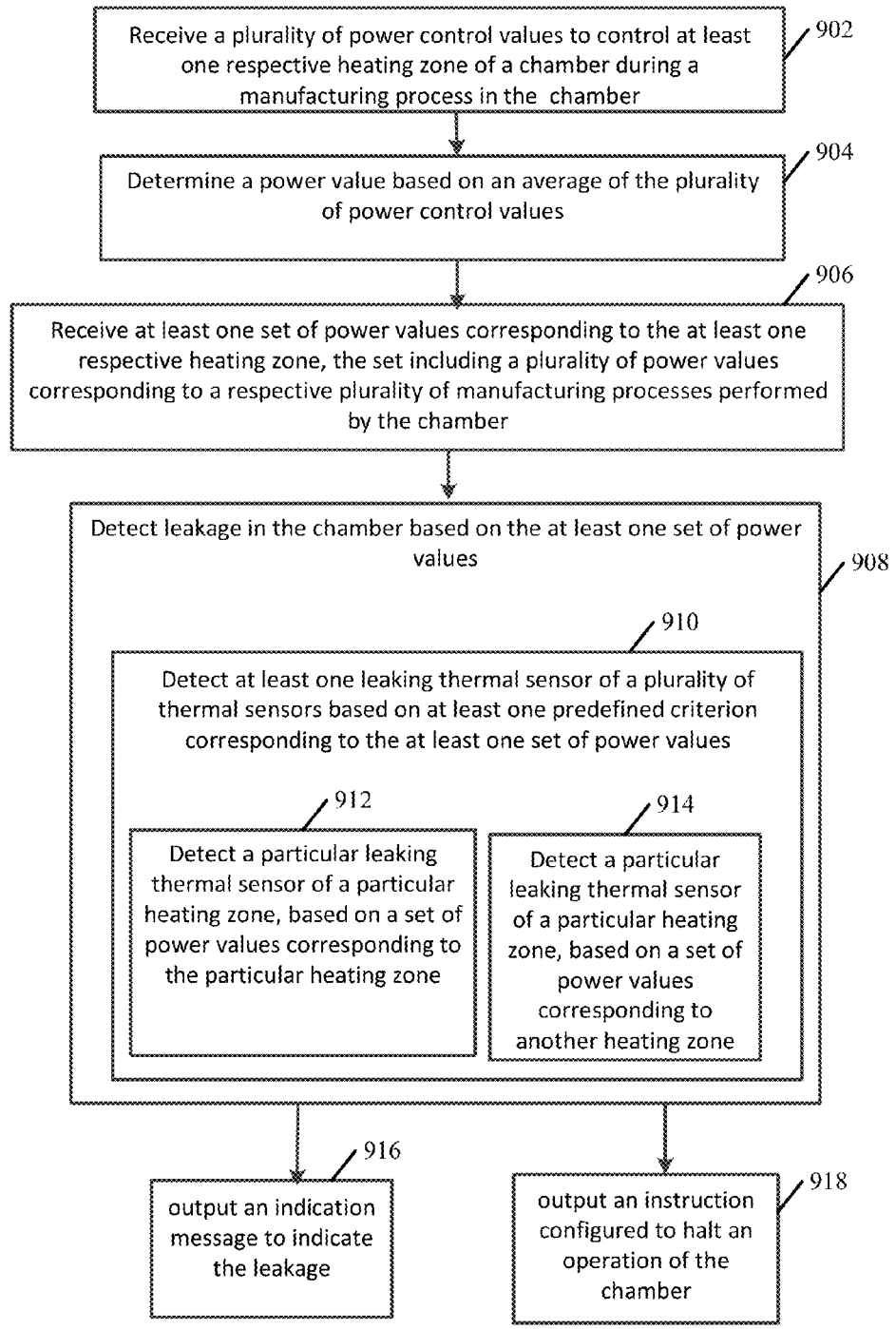
FIG. 9 is a schematic flow chart illustration of a method of detecting leakage in a chamber, in accordance with some demonstrative embodiments.

Reference is made to FIG. 9, which schematically illustrates a flow chart of a method of detecting leakage in a reactor chamber, in accordance with some demonstrative embodiments. In some embodiments, one or more of the operations of the method of FIG. 9 may be performed by a leakage detector, e.g., leakage detector 150 (FIG. 1), calculator 654 (FIG. 6), leakage detector 750 (FIG. 7), and/or leakage detector 850 (FIG. 7).

As indicated at block 902, the method may include receiving a plurality of power control values to control at least one respective heating zone of a reactor chamber during a manufacturing process in the reactor chamber. For example, leakage detector 150 (FIG. 1) may receive the plurality of power control values 123, 125, 127, and/or 129 (FIG. 1), e.g., as described above.

As indicated at block 904, the method may include determining a power value based on the plurality of power control values. For example, leakage detector 150 (FIG. 1) may determine a center power value, a front power value, a rear power value, and/or a rear power value, based on the plurality of power control values 123, 125, 127, and/or 129 (FIG. 1), respectively, e.g., as described above.

As indicated at block 906, the method may include receiving at least one set of power values corresponding to the at least one respective heating zone, the set including a plurality of power values corresponding to a respective plurality of manufacturing processes performed by the reactor chamber. For example, leakage detector 150 (FIG. 1) may receive the plurality of center power values 163 (FIG. 1), the plurality of front power values 165 (FIG. 1), the plurality of side power values 167 (FIG. 1), and/or the plurality of rear power values 169 (FIG. 1), e.g., as described above.

As indicated at block 908, the method may include detecting leakage in the reactor chamber based on the at least one set of power values. For example, leakage detector 150 (FIG. 1) may detect leakage in chamber 110 (FIG. 1), based on at least one set of sets of power values 163, 165, 167, and/or 169 (FIG. 1), e.g., as described above As indicated at block 910 detecting the leakage in the reactor chamber may include detecting at least one leaking thermal sensor of a plurality of thermal sensors, based on at least one predefined criterion corresponding to the at least one set of power values. For example, leakage detector 150 (FIG. 1) may detect at least one leaking thermal sensor of the plurality of thermal sensors 131, based on the statistical function on at least one set of the sets of power values 163, 165, 167, and/or 169 (FIG. 1), e.g., as described above.

As indicated at block 912 detecting the at least one leaking thermal sensor may include detecting a particular leaking thermal sensor of a particular heating zone, based on a set of power values corresponding to the particular heating zone. For example, leakage detector 150 (FIG. 1) may detect leaking rear thermal sensor 138 (FIG. 1) based on the set of center power values 169 (FIG. 1), e.g., as described above.

As indicated at block 914 detecting the at least one leaking thermal sensor may include detecting a particular leaking thermal sensor of a particular heating zone, based on a set of power values corresponding to another heating zone. For example, leakage detector 150 (FIG. 1) may detect leaking side thermal sensor 136 (FIG. 1), based on the set of center rear power values 169 (FIG. 1), e.g., as described above.

As indicated at block 916, the method may include outputting an indication message to indicate the leakage. For example, leakage detector 150 (FIG. 1) may output indication message 156 (FIG. 1), e.g., as described above.

As indicated at block 918, the method may include outputting an instruction configured to halt an operation of the reactor chamber. For example, leakage detector 150 (FIG. 1) may output instruction 146 (FIG. 1) to halt operation of device 102 (FIG. 1), e.g., as described above.

Reference is made to FIG. 10, which schematically illustrates a product of manufacture 1000, in accordance with some demonstrative embodiments. Product 1000 may include one or more tangible computer-readable non-transitory storage media 1002 to store logic 1004, which may be used, for example, to perform at least part of the functionality of leakage detector 150 (FIG. 1), leakage detector 750 (FIG. 7), leakage detector 850 (FIG. 8), analyzer 154 (FIG. 1), data processor 152 (FIG. 1), data acquisition module 652 (FIG. 6), and/or calculator 654 (FIG. 6), and/or to perform one or more operations of the method of FIG. 9. The phrase "non-transitory machine-readable medium" is directed to include all computer-readable media, with the sole exception being a transitory propagating signal.

In some demonstrative embodiments, product 1000 and/or media 1002 may include one or more types of computer-readable storage media capable of storing data, including volatile memory, non-volatile memory, removable or non-removable memory, erasable or non-erasable memory, writeable or re-writeable memory, and the like. For example, machine-readable storage medium 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1004 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising a leakage detector to detect leakage in a reactor chamber based on at least one set of power values corresponding to at least one respective heating zone of the reactor chamber, the set of power values including a plurality of power values corresponding to a respective plurality of semiconductor manufacturing processes performed by the reactor chamber, wherein a power value of a semiconductor manufacturing process is based on a plurality of power control values to control the heating zone during the semiconductor manufacturing process.

Example 2 includes the subject matter of Example 1, and optionally, wherein the leakage detector is to detect at least one leaking thermal sensor of a plurality of thermal sensors based on at least one predefined criterion corresponding to the at least one set of power values, the plurality of thermal sensors to sense temperatures in a respective plurality of heating zones of the reactor chamber, and the power control values being based on the temperatures.

Example 3 includes the subject matter of Example 2, and optionally, wherein the leakage detector is to detect a particular leaking thermal sensor of a particular heating zone, based on a set of power values corresponding to the particular heating zone.

Example 4 includes the subject matter of Example 2, and optionally, wherein the leakage detector is to detect a particular leaking thermal sensor of a particular heating zone, based on a set of power values corresponding to another heating zone.

Example 5 includes the subject matter of any one of Examples 2-4, and optionally, wherein the thermal sensor comprises a quartz-lined thermocouple.

Example 6 includes the subject matter of any one of Examples 2-5, and optionally, wherein the predefined criterion relates to a statistical function of the at least one set of power values.

Example 7 includes the subject matter of any one of Examples 1-6, and optionally, wherein the at least one set of power values comprises at least one set selected from the group consisting of a set of center power values corresponding to a center heating zone of the reactor chamber, a set of rear power values corresponding to a rear heating zone of the reactor chamber, a set of front power values corresponding to a front heating zone of the reactor chamber, and a set of side power values corresponding to a side heating zone of the reactor chamber.

Example 8 includes the subject matter of Example 7, and optionally, wherein the leakage detector is to detect a rear leaking thermal sensor corresponding to the rear heating zone, based on the set of rear power values.

Example 9 includes the subject matter of Example 7 or 8, and optionally, wherein the leakage detector is to detect a center leaking thermal sensor corresponding to the center heating zone, based on the set of center power values, the set of front power values, and the set of side power values.

Example 10 includes the subject matter of any one of Examples 7-9, and optionally, wherein the leakage detector is to detect a front leaking thermal sensor corresponding to the front heating zone, based on the set of center power values, the set of front power values, and the set of side power values.

Example 11 includes the subject matter of any one of Examples 7-10, and optionally, wherein the leakage detector is to detect a side leaking thermal sensor corresponding to the side heating zone, based on the set of side power values and the set of rear power values.

Example 12 includes the subject matter of any one of Examples 1-11, and optionally, wherein the leakage detector is to receive the plurality of power control values of the manufacturing process, and to determine the power value based on an average of the plurality of power control values.

Example 13 includes the subject matter of any one of Examples 1-12, and optionally, wherein the leakage detector is to output an indication message to indicate the leakage.

Example 14 includes the subject matter of any one of Examples 1-13, and optionally, wherein the leakage detector is to output an instruction configured to halt an operation of the reactor chamber.

Example 15 includes the subject matter of any one of Examples 1-14, and optionally, wherein the reactor chamber comprises an epitaxial (EPI) growth reactor chamber.

Example 16 includes the subject matter of Example 15, and optionally, wherein the power value is based on a plurality of power control values to control the heating zone during an epitaxial layer deposition step of the manufacturing process.

Example 17 includes a reactor to process semiconductor substrates, the reactor comprising a reactor chamber; a plurality of heaters to heat a plurality of heating zones of the reactor chamber; a plurality of thermal sensors to sense temperatures in the plurality of heating zones; a heating controller to control the plurality of heaters based on the temperatures; and a leakage detector to detect leakage in the reactor chamber based on at least one set of power values corresponding to at least one respective heating zone of the plurality of heating zones, the set of power values including a plurality of power values corresponding to a respective plurality of semiconductor manufacturing processes performed by the reactor chamber, wherein a power value of a semiconductor manufacturing process is based on a plurality of power control values provided by the heating controller to control the heating zone during the manufacturing process.

Example 18 includes the subject matter of Example 17, and optionally, wherein the leakage detector is to detect at least one leaking thermal sensor of the plurality of thermal sensors based on at least one predefined criterion corresponding to the at least one set of power values.

Example 19 includes the subject matter of Example 18, and optionally, wherein the leakage detector is to detect a particular leaking thermal sensor of a particular heating zone, based on a set of power values corresponding to the particular heating zone.

Example 20 includes the subject matter of Example 18, and optionally, wherein the leakage detector is to detect a particular leaking thermal sensor of a particular heating zone, based on a set of power values corresponding to another heating zone.

Example 21 includes the subject matter of any one of Examples 18-20, and optionally, wherein the predefined criterion relates to a statistical function of the at least one set of power values.

Example 22 includes the subject matter of any one of Examples 17-21, and optionally, wherein the at least one set of power values comprises at least one set selected from the group consisting of a set of center power values corresponding to a center heating zone of the reactor chamber, a set of rear power values corresponding to a rear heating zone of the reactor chamber, a set of front power values corresponding to a front heating zone of the reactor chamber, and a set of side power values corresponding to a side heating zone of the reactor chamber.

Example 23 includes the subject matter of Example 22, and optionally, wherein the leakage detector is to detect a rear leaking thermal sensor corresponding to the rear heating zone, based on the set of rear power values.

Example 24 includes the subject matter of Example 22 or 23, and optionally, wherein the leakage detector is to detect a center leaking thermal sensor corresponding to the center heating zone, based on the set of center power values, the set of front power values, and the set of side power values.

Example 25 includes the subject matter of any one of Examples 22-24, and optionally, wherein the leakage detector is to detect a front leaking thermal sensor corresponding to the front heating zone, based on the set of center power values, the set of front power values, and the set of side power values.

Example 26 includes the subject matter of any one of Examples 22-24, and optionally, wherein the leakage detector is to detect a side leaking thermal sensor corresponding to the side heating zone, based on the set of side power values and the set of rear power values.

Example 27 includes the subject matter of any one of Examples 17-26, and optionally, wherein the leakage detector is to receive the plurality of power control values of the manufacturing process, and to determine the power value based on an average of the plurality of power control values.

Example 28 includes the subject matter of any one of Examples 17-27, and optionally, wherein the leakage detector is to output an indication message to indicate the leakage.

Example 29 includes the subject matter of any one of Examples 17-28, and optionally, wherein the leakage detector is to output an instruction configured to halt an operation of the reactor chamber.

Example 30 includes the subject matter of any one of Examples 17-29, and optionally, wherein the reactor chamber comprises an epitaxial (EPI) growth reactor chamber and the plurality of thermal sensors comprises quartz-lined thermocouples.

Example 31 includes the subject matter of Example 30, and optionally, wherein the power value is based on a plurality of power control values to control the heating zone during an epitaxial layer deposition step of the manufacturing process.

Example 32 includes a product including one or more tangible computer-readable non-transitory storage media comprising computer-executable instructions operable to, when executed by at least one computer processor, enable the at least one computer processor to implement a method comprising receiving at least one set of power values corresponding to at least one respective heating zone of a reactor chamber, the set of power values including a plurality of power values corresponding to a respective plurality of semiconductor manufacturing processes performed by the reactor chamber, wherein a power value of a semiconductor manufacturing process is based on a plurality of power control values to control the heating zone during the manufacturing process; and detecting leakage in the reactor chamber based on the at least one set of power values.

Example 33 includes the subject matter of Example 32, and optionally, wherein the method comprises detecting at least one leaking thermal sensor of a plurality of thermal sensors based on at least one predefined criterion corresponding to the at least one set of power values, the plurality of thermal sensors to sense temperatures in a respective plurality of heating zones of the reactor chamber, and the power control values being based on the temperatures.

Example 34 includes the subject matter of Example 33, and optionally, wherein the method comprises detecting a particular leaking thermal sensor of a particular heating zone, based on a set of power values corresponding to the particular heating zone.

Example 35 includes the subject matter of Example 33, and optionally, wherein the method comprises detecting a particular leaking thermal sensor of a particular heating zone, based on a set of power values corresponding to another heating zone.

Example 36 includes the subject matter of any one of Examples 33-35, and optionally, wherein the thermal sensor comprises a quartz-lined thermocouple.

Example 37 includes the subject matter of any one of Examples 33-36, and optionally, wherein the predefined criterion relates to a statistical function of the at least one set of power values.

Example 38 includes the subject matter of any one of Examples 32-37, and optionally, wherein the at least one set of power values comprises at least one set selected from the group consisting of a set of center power values corresponding to a center heating zone of the reactor chamber, a set of rear power values corresponding to a rear heating zone of the reactor chamber, a set of front power values corresponding to a front heating zone of the reactor chamber, and a set of side power values corresponding to a side heating zone of the reactor chamber.

Example 39 includes the subject matter of Example 38, and optionally, wherein the method comprises detecting a rear leaking thermal sensor corresponding to the rear heating zone, based on the set of rear power values.

Example 40 includes the subject matter of Example 38 or 39, and optionally, wherein the method comprises detecting a center leaking thermal sensor corresponding to the center heating zone, based on the set of center power values, the set of front power values, and the set of side power values.

Example 41 includes the subject matter of any one of Examples 38-40, and optionally, wherein the method comprises detecting a front leaking thermal sensor corresponding to the front heating zone, based on the set of center power values, the set of front power values, and the set of side power values.

Example 42 includes the subject matter of any one of Examples 38-41, and optionally, wherein the method comprises detecting a side leaking thermal sensor corresponding to the side heating zone, based on the set of side power values and the set of rear power values.

Example 43 includes the subject matter of any one of Examples 32-42, and optionally, wherein the method comprises receiving the plurality of power control values of the manufacturing process, and determining the power value based on an average of the plurality of power control values.

Example 44 includes the subject matter of any one of Examples 32-43, and optionally, wherein the method comprises outputting an indication message to indicate the leakage.

Example 45 includes the subject matter of any one of Examples 32-44, and optionally, wherein the method comprises outputting an instruction configured to halt an operation of the reactor chamber.

Example 46 includes the subject matter of any one of Examples 32-45, and optionally, wherein the reactor chamber comprises an epitaxial (EPI) growth reactor chamber.

Example 47 includes the subject matter of any one of Examples 32-46, and optionally, wherein the power value is based on a plurality of power control values of the heating zone during an epitaxial layer deposition step of the manufacturing process.

Example 48 includes a method comprising receiving at least one set of power values corresponding to at least one respective heating zone of a reactor chamber, the set of power values including a plurality of power values corresponding to a respective plurality of semiconductor manufacturing processes performed by the reactor chamber, wherein a power value of a semiconductor manufacturing process is based on a plurality of power control values to control the heating zone during the manufacturing process; and detecting leakage in the reactor chamber based on the at least one set of power values.

Example 49 includes the subject matter of Example 48, and optionally, wherein the method comprises detecting at least one leaking thermal sensor of a plurality of thermal sensors based on at least one predefined criterion corresponding to the at least one set of power values, the plurality of thermal sensors to sense temperatures in a respective plurality of heating zones of the reactor chamber, and the power control values being based on the temperatures.

Example 50 includes the subject matter of Example 49, and optionally, wherein the method comprises detecting a particular leaking thermal sensor of a particular heating zone, based on a set of power values corresponding to the particular heating zone.

Example 51 includes the subject matter of Example 49, and optionally, wherein the method comprises detecting a particular leaking thermal sensor of a particular heating zone, based on a set of power values corresponding to another heating zone.

Example 52 includes the subject matter of any one of Examples 49-51, and optionally, wherein the thermal sensor comprises a quartz-lined thermocouple.

Example 53 includes the subject matter of any one of Examples 49-52, and optionally, wherein the predefined criterion relates to a statistical function of the at least one set of power values.

Example 54 includes the subject matter of any one of Examples 48-53, and optionally, wherein the at least one set of power values comprises at least one set selected from the group consisting of a set of center power values corresponding to a center heating zone of the reactor chamber, a set of rear power values corresponding to a rear heating zone of the reactor chamber, a set of front power values corresponding to a front heating zone of the reactor chamber, and a set of side power values corresponding to a side heating zone of the reactor chamber.

Example 55 includes the subject matter of Example 54, and optionally, wherein the method comprises detecting a rear leaking thermal sensor corresponding to the rear heating zone, based on the set of rear power values.

Example 56 includes the subject matter of Example 54 or 55, and optionally, wherein the method comprises detecting a center leaking thermal sensor corresponding to the center heating zone, based on the set of center power values, the set of front power values, and the set of side power values.

Example 57 includes the subject matter of any one of Examples 54-56, and optionally, wherein the method comprises detecting a front leaking thermal sensor corresponding to the front heating zone, based on the set of center power values, the set of front power values, and the set of side power values.

Example 58 includes the subject matter of any one of Examples 54-57, and optionally, wherein the method comprises detecting a side leaking thermal sensor corresponding to the side heating zone, based on the set of side power values and the set of rear power values.

Example 59 includes the subject matter of any one of Examples 48-58, and optionally, wherein the method comprises receiving the plurality of power control values of the manufacturing process, and determining the power value based on an average of the plurality of power control values.

Example 60 includes the subject matter of any one of Examples 48-59, and optionally, wherein the method comprises outputting an indication message to indicate the leakage.

Example 61 includes the subject matter of any one of Examples 48-60, and optionally, wherein the method comprises outputting an instruction configured to halt an operation of the reactor chamber.

Example 62 includes the subject matter of any one of Examples 48-61, and optionally, wherein the reactor chamber comprises an epitaxial (EPI) growth reactor chamber.

Example 63 includes the subject matter of any one of Examples 48-62, and optionally, wherein the power value is based on a plurality of power control values of the heating zone during an epitaxial layer deposition step of the manufacturing process.

Example 64 includes an apparatus comprising a leakage detector to detect leakage in a chamber based on at least one set of power values corresponding to at least one respective heating zone of the chamber, the set of power values including a plurality of power values corresponding to a respective plurality of manufacturing processes performed by the reactor chamber, wherein a power value of a manufacturing process is based on a plurality of power control values to control the heating zone during the manufacturing process.

Example 65 includes the subject matter of Example 64, and optionally, wherein the manufacturing process comprises a semiconductor manufacturing process.

Example 66 includes a processing device, the device comprising a chamber; a plurality of heaters to heat a plurality of heating zones of the chamber; a plurality of thermal sensors to sense temperatures in the plurality of heating zones; a heating controller to control the plurality of heaters based on the temperatures; and a leakage detector to detect leakage in the chamber based on at least one set of power values corresponding to at least one respective heating zone of the plurality of heating zones, the set of power values including a plurality of power values corresponding to a respective plurality of manufacturing processes performed by the chamber, wherein a power value of a manufacturing process is based on a plurality of power control values provided by the heating controller to control the heating zone during the manufacturing process.

Example 67 includes the subject matter of Example 66, and optionally, wherein the leakage detector is to output an instruction configured to halt an operation of the chamber.

Example 68 includes a product including one or more tangible computer-readable non-transitory storage media comprising computer-executable instructions operable to, when executed by at least one computer processor, enable the at least one computer processor to implement a method comprising receiving at least one set of power values corresponding to at least one respective heating zone of a chamber, the set of power values including a plurality of power values corresponding to a respective plurality of manufacturing processes performed by the chamber, wherein a power value of a manufacturing process is based on a plurality of power control values to control the heating zone during the manufacturing process; and detecting leakage in the chamber based on the at least one set of power values.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
    a data processing component to determine at least one set of power values corresponding to at least one respective heating zone of a chamber, said set of power values including a plurality of power values corresponding to a respective plurality of manufacturing processes performed by said chamber, wherein a power value corresponding to a manufacturing process is based on a plurality of power control values to control said heating zone during said manufacturing process; and
    a leakage detector component to detect at least one leaking thermal sensor of a plurality of thermal sensors, which are to sense temperatures in a respective plurality of heating zones of said chamber, the leakage detector to detect the at least one leaking thermal sensor based on at least one predefined criterion corresponding to said at least one set of power values.

2. The apparatus of claim 1, wherein said power control values are based on said temperatures.

3. The apparatus of claim 1, wherein said leakage detector is to detect a particular leaking thermal sensor of a particular heating zone, based on a set of power values corresponding to said particular heating zone.

4. The apparatus of claim 1, wherein said leakage detector is to detect a particular leaking thermal sensor of a particular heating zone, based on a set of power values corresponding to another heating zone.

5. The apparatus of claim 1, wherein said thermal sensor comprises a quartz-lined thermocouple.

6. The apparatus of claim 1, wherein said predefined criterion relates to a statistical function of said at least one set of power values.

7. The apparatus of claim 1, wherein said at least one set of power values comprises at least one set selected from the group consisting of a set of center power values corresponding to a center heating zone of said chamber, a set of rear power values corresponding to a rear heating zone of said chamber, a set of front power values corresponding to a front heating zone of said chamber, and a set of side power values corresponding to a side heating zone of said chamber.

8. The apparatus of claim 7, wherein said leakage detector is to detect a center leaking thermal sensor corresponding to said center heating zone or a front leaking thermal sensor corresponding to said front heating zone, based on said set of center power values, said set of front power values, and said set of side power values.

9. The apparatus of claim 1, wherein said data processing component is to receive said plurality of power control values of said manufacturing process, and to determine said power value based on an average of said plurality of power control values.

10. The apparatus of claim 1, wherein said manufacturing process comprises a semiconductor manufacturing process.

11. The apparatus of claim 1, wherein said chamber comprises an epitaxial (EPI) growth reactor chamber.

12. The apparatus of claim 11, wherein said power value is based on a plurality of power control values to control said heating zone during an epitaxial layer deposition step of said manufacturing process.

13. A processing device comprising:
a chamber;
a plurality of heaters to heat a plurality of heating zones of said chamber;
a plurality of thermal sensors to sense temperatures in said plurality of heating zones;
a heating controller to control said plurality of heaters based on said temperatures;
a data processing component to determine at least one set of power values corresponding to at least one respective heating zone of said plurality of heating zones, said set of power values including a plurality of power values corresponding to a respective plurality of manufacturing processes performed by said processing device, wherein a power value corresponding to a manufacturing process is based on a plurality of power control values provided by said heating controller to control said heating zone during said manufacturing process; and
a leakage detector component to detect at least one leaking thermal sensor of said plurality of thermal sensors based on at least one predefined criterion corresponding to said at least one set of power values.

14. The device of claim 13, wherein said thermal sensor comprises a quartz-lined thermocouple.

15. The device of claim 13, wherein said at least one set of power values comprises at least one set selected from the group consisting of a set of center power values corresponding to a center heating zone of said chamber, a set of rear power values corresponding to a rear heating zone of said chamber, a set of front power values corresponding to a front heating zone of said chamber, and a set of side power values corresponding to a side heating zone of said chamber.

16. The device of claim 13, wherein said leakage detector is to output an instruction configured to halt an operation of said chamber.

17. A product comprising one or more tangible computer-readable non-transitory storage media comprising computer-executable instructions operable to, when executed by at least one computer processor, enable the at least one computer processor to:
determine at least one set of power values corresponding to at least one respective heating zone of a chamber, said set of power values including a plurality of power values corresponding to a respective plurality of manufacturing processes performed by said chamber, wherein a power value corresponding to a manufacturing process is based on a plurality of power control values to control said heating zone during said process; and
detect at least one leaking thermal sensor of a plurality of thermal sensors, which are to sense temperatures in a respective plurality of heating zones of said chamber, detecting the at least one leaking thermal sensor comprises detecting the at least one leaking thermal sensor based on at least one predefined criterion corresponding to said at least one set of power values.

18. The product of claim 17, wherein said instructions, when executed, enable the at least one computer processor to detect a particular leaking thermal sensor of a particular heating zone, based on a set of power values corresponding to another heating zone.

19. The product of claim 17, wherein said at least one set of power values comprises at least one set selected from the group consisting of a set of center power values corresponding to a center heating zone of said chamber, a set of rear power values corresponding to a rear heating zone of said chamber, a set of front power values corresponding to a front heating zone of said chamber, and a set of side power values corresponding to a side heating zone of said chamber.

20. The product of claim 17, wherein said instructions, when executed, enable the at least one computer processor to receive said plurality of power control values of said manufacturing process, and to determine said power value based on an average of said plurality of power control values.

* * * * *